Sept. 11, 1962 W. R. LINCOURT 3,053,305
AUTOMOBILE FRAME STRAIGHTENER
Filed Feb. 6, 1961 2 Sheets-Sheet 1
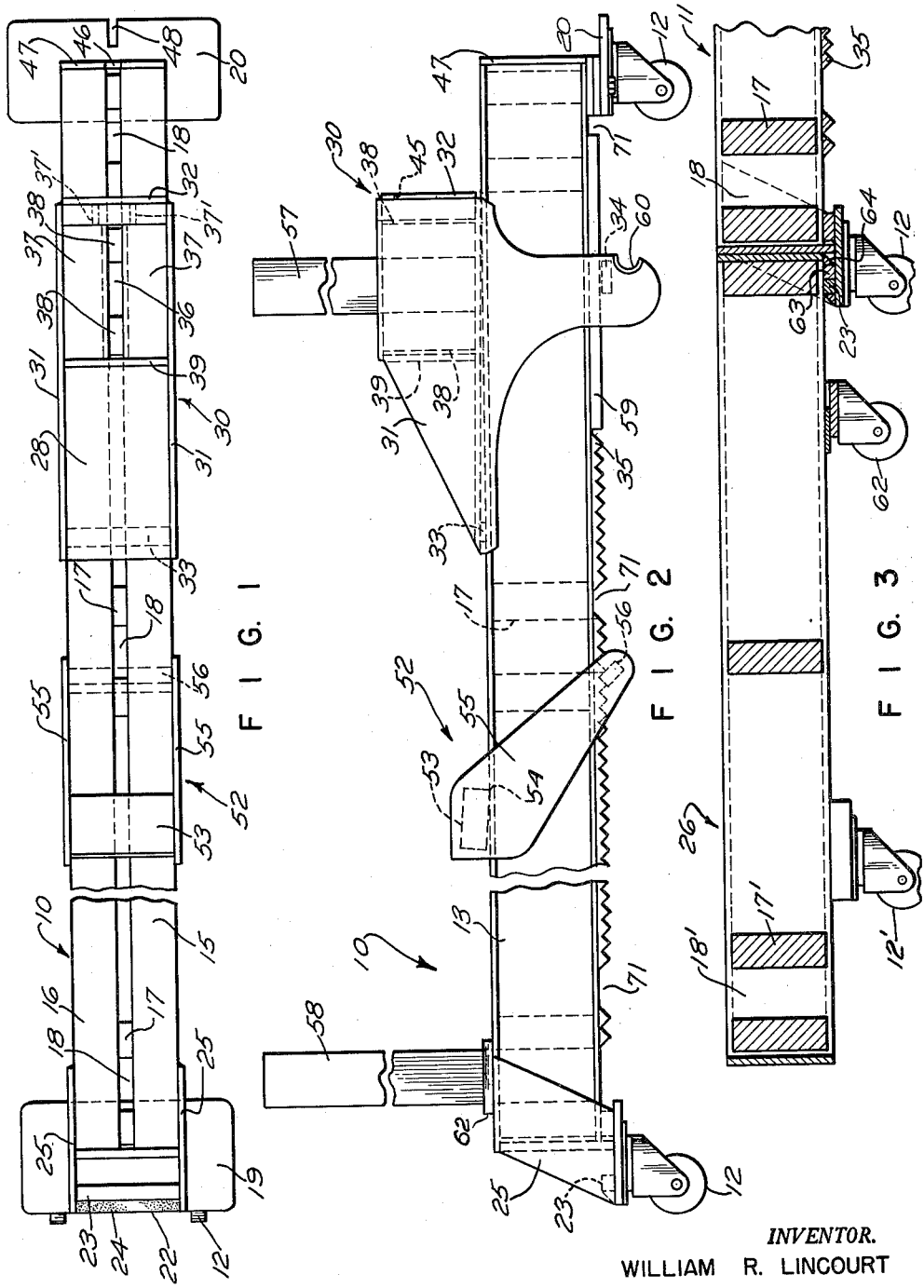
INVENTOR.
WILLIAM R. LINCOURT
BY
Barlow & Barlow
ATTORNEYS

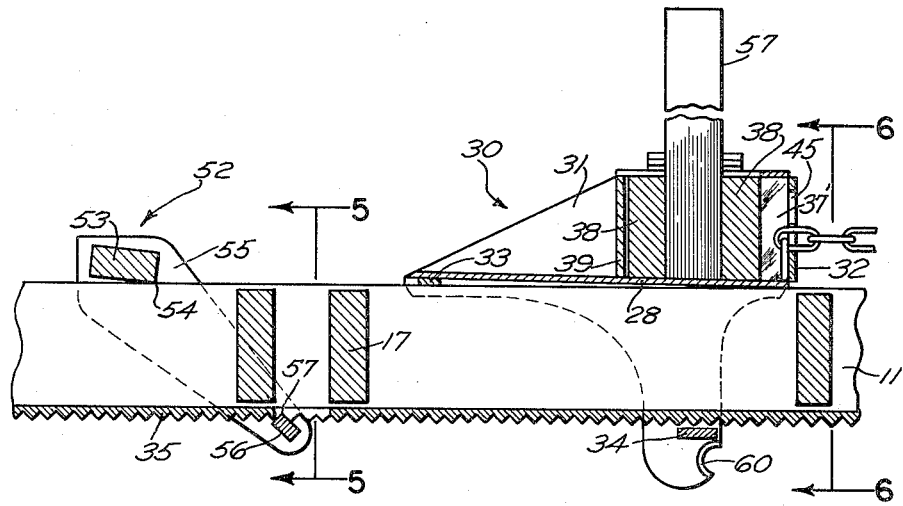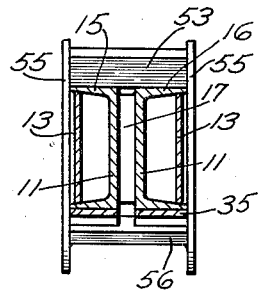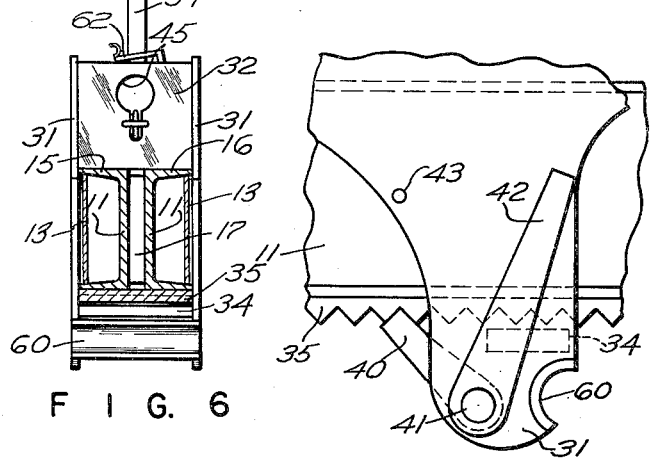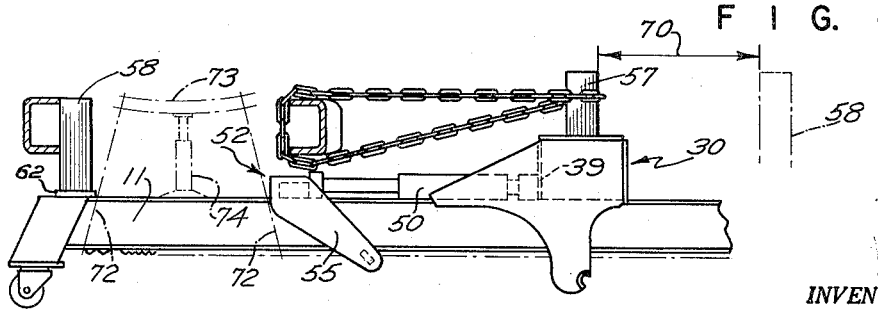

United States Patent Office 3,053,305
Patented Sept. 11, 1962

3,053,305
AUTOMOBILE FRAME STRAIGHTENER
William R. Lincourt, 54 E. Bowery St., Newport, R.I.
Filed Feb. 6, 1961, Ser. No. 87,133
5 Claims. (Cl. 153—48)

This invention relates to an apparatus for use with a hydraulic jack for straightening automobile frames and is a continuation-in-part of my application, Serial No. 752,084, filed July 30, 1958 and now abandoned.

It is usual practice in the automobile repair art to employ a hydraulic jack for straightening an automobile frame damaged by collision. The hydraulic jack is arranged to apply a force at the damaged location of the frame in a direction in reverse to that imparted to the frame by the collision. In most instances this requires removing fenders, bumpers and other parts of the body so as to position the jack against an opposite support and allow the application of force in the desired direction. This practice is time consuming, laborious and costly.

An object of the invention is to provide a portable apparatus which can be readily maneuvered under an automobile, anchored to a portion of the automobile, and maintained in position for applying a frame straightening force in a desired direction.

Another object of the invention is to provide an apparatus having a jack support abutment which may be adjustably moved with force applying members so that a jack extension is unnecessary.

A further object of the invention is to provide a device which may be used to apply both pulling and pushing forces to a member.

A still further object of the invention is to provide an apparatus which will accomplish all body straightening operations simply.

With these and other objects in view, the invention consists of certain novel features of construction as will be more fully described and particularly pointed out in the appended claims.

In the accompanying drawings:

FIGURE 1 is a top plan view of an apparatus embodying the invention for straightening automobile frames;

FIGURE 2 is a side elevational view thereof;

FIGURE 3 is a side elevational view, partially in section, of a body extension for the apparatus of FIGURE 1;

FIGURE 4 is a central longitudinal sectional view of a fragmentary portion of the apparatus;

FIGURE 5 is a sectional view taken substantially along line 5—5 of FIGURE 4;

FIGURE 6 is a sectional view taken substantially along line 6—6 of FIGURE 4;

FIGURE 7 is a side elevational view of a fragmentary portion of the apparatus showing several use applications of the apparatus; and FIGURE 8 is an elevational view on an enlarged scale of a fragmentary portion of the slide showing a modification.

Referring to the drawing in more detail, there is shown a carriage having an elongated beam 10 which is mounted on casters or swivel wheels 12. The beam 10 preferably comprises two similar channel members 11 (FIGURE 5) which are positioned back-to-back with the inner edges of adjacent flanges 15, 16 thereof spaced from each other by blocks 17. Plates 13 are welded in place in the open channels so as to form a boxlike girder beam. There are provided along the length of the beam, sockets 18 which are similar to each other and extend inwardly from and flush with the upper side of said body. Plates 19 and 20 are secured to the ends of the body and to these plates are attached the said casters 12. The caster set and plate 20 is bolted to the beam and in this fashion the parts that embrace the beam may be slid thereon. The plate 19 is welded to the beam through a spacer block and extends beyond the end of the beam 11 to provide an extending lip portion 22 on which a rectangular crossbar 23 is positioned and secured in spaced relation with the end of the beam 10 as by a filet weld 24. Side plates 25 are positioned and secured against the outer sides of the beam as by welding and embrace the ends of bar 23. In this fashion a socket or coupling for attaching an extension 26 (FIGURE 3) to the carriage is formed, which will be hereinafter described in detail.

There is mounted on the carriage a force transmitting slide 30. This slide consists of a pair of side walls 31 that are joined together by a base plate 28 and a lower crossbar 34. The base plate 28 is adapted to slide along the upper flanges of the beam 10, and to prevent excessive friction against the upper flanges 15, 16, a small spacer block 33 is provided underneath one end of the plate 28. To maintain the slide in position against rocking forces imparted thereto, the bar 34 is adapted to slidably engage the longitudinal rack 35 which is secured to the underside of the beam 10. The slide 30 has a vertically extending socket 36 built thereon which is similar to the socket 18. This socket is formed by a pair of channel sections 37 which are positioned back to back with spacer blocks or bars 38 therebetween (see FIGURE 1). An end plate 39 is provided against one end of the channel sections and a pair of plates 37' space the other end of the channel sections 37 from an end plate 32.

To lock the slide against sliding movement which may be desirable in certain circumstances, a keyhole slot 45 is formed in the plate 32 (see FIGURE 6) through which a chain may pass and in which one link will be secured. This chain may be led over the end of the carriage and through a slotted space 46 cut into an end plate 47 on the end of the two channel members 11 and thence into a locking slot 48 formed in the plate 20. Alternately, a pawl 40 carried on a crossrod 41 may be rockably mounted on the side walls 31 to extend beneath the rack 35. The pawl is adapted to engage the rack 35 which is carried by the beam 10. It will be seen that if the rod 41 is rocked in one or the other direction by a handle 42 that the pawl 40 may be made to engage the rack 35 and lock the slide against movement. Rocking the handle in the other direction against a stop pin 43 will free the slide for movement.

In use of the apparatus, force is applied to the slide 30 by means of a hydraulic jack 50 (see FIGURE 8) which has one end positioned against the pressure applying plate 39 secured to the socket portion 36 of the slide. The other end of the jack is positioned against a stop 52 which is adjustably mounted on the beam 10 and has a crossbar 53 which normally rests with one edge 54 on the upper side of the flanges 15, 16. Arms 55 extend from the ends of said bar and are connected to each other by a crossbar 56 which has an edge portion 57 extending into engagement with the rack 35. Referring to FIGURES 2 and 4, it will be seen the arms 55 extend at a slant towards slide 30 which offsets the point of engagement of bar 56 with respect to the bar 53. Thus a force applied to bar 53 will tend to rock arms 55 and move bar 53 into tight frictional engagement with the flanges 15, 16 and also move bar 56 into a generally vertical directed engagement with rack teeth 35. Accordingly there will be a binding action of the stop against the beam 10 to resist movement thereof along beam 10. In order to change the location of the stop 52, the same may be rocked in a crosswise direction as viewed in the drawings about the edge 54 of the crossbar 53 which also will present a small frictional area for the stop to be moved along the upper flanges 15, 16 of the beam 10.

The apparatus may be used in many different ways depending upon the work to be done. In general the principal function of the apparatus is to apply a force to the parts of the damaged frame in a direction opposite or in the reverse to the direction of the force imparted thereto as the result of the collision. The force may be applied to the required location on the frame by engaging the same by means of an upright or bar 58 inserted and held in one of the sockets 18. A similar bar 57 is inserted in the socket 36 of the slide and the damaged frame portion to be straightened may then be secured to the upright 57 as by means of a chain tie. With the jack 50 in proper position against the stop and slide, the jack may be now actuated to impose a force against the slide 30 to be transmitted thereby to the said damaged portion of the frame in the reverse direction to that imparted thereto by the collision. It will be particularly noted that in the example shown, the slide is positioned outwardly of the frame of the automobile which eliminates the necessity of removing parts of the body of the automobile.

In instances wherein the force is needed between two remote parts of the chassis as between the front and rear portions thereof, the extension 26 is employed. The extension is made similar to the beam 10 with the exception that a single socket 18' is provided at the rear thereof. To facilitate movement, the extension beam is provided with wheels 12' and 62 secured to the underside thereof. The wheels 62 are spaced inwardly from the end of the extension 26 which provides an extending portion adapted to rest on the protruding plate 19. To provide a coupling, the forward end of the extension 26 has a laterally extending bar 63 welded in position by filet 64 to the bottom side of the extension body. In this fashion the forward end portion of the extension 26 is adapted to be positioned in the space between the side plates or walls 25 and with the bar 63 abutting the bar 23 coupling of the extension and beam 10 is had.

The apparatus is very versatile in the use thereof and is readily maneuvered into position beneath a damaged frame. The uprights or bars 57, 58 while rugged, are of a dimension to be easily positioned against the different parts of the chassis without the necessity of removing parts of the body of the automobile. It will be noted that the carriage may be readily moved under the chasis of an automobile, and to accomplish this result, it will be noted that each of the sockets 18 is a through socket. In this fashion it is easy to drop the upright bars 58 to the floor, thus lessening their height so that the carriage may be slid under the chassis and then the bars may be raised and held in position in a variety of fashions, such as by pinning the bars in position or by the use of friction clips 62 (see FIGURE 6), which are all well known to those skilled in the art and need not be described in detail here.

The slide, it will be noted, is ruggedly constructed and is made in a fashion to be easily slid along the flanges 15, 16 of the beam 10. It has been generally found that the slide 30 will be operated in most instances at one end of the beam. Accordingly, to prevent excessive wear occurring on the rack teeth 35, at least one section of the rack may be replaced by a friction plate such as 59. In this fashion the bar 34 bears against the exposed face of this plate 59 and distributes its load more evenly.

Also in some instances it may be desirable to utilize the slide for producing an angular pulling force. To accomplish this result, a half round section 60 is provided across the side walls 31 of the slide 30 into which a force transmitting chain may be passed. It should also be made clear that the apparatus disclosed herein is not only adaptable to the pulling of parts with respect to the beam, but is adaptable to exerting compressive forces. In such instances, one of the uprights 58 may be positioned as shown in the broken lines in FIGURE 7 so that a compression may be had in the area between the arrows 70. Also a vertical force may be applied with the use of this carriage, and to this end I have provided a number of spaces in the rack 35 along the underside of the beam as indicated by the numeral 71. Thus, a pair of chains, such as indicated by the broken lines 72, may be wrapped around the underside of the beam 10 and also around a member such as 73 which is desired to be bent back into horizontal position. A jack such as 74 can then be placed on the flanges 15, 16 and brought to bear on the underside of the member 73 as shown diagrammatically in FIGURE 7.

I claim:

1. In a frame straightening apparatus, a horizontal beam provided with a plurality of sockets in its upper surface spaced along the length thereof and extending substantially through the beam, a bar in a selected one of said sockets to provide an abutment on the upper side of said beam, a slide protruding from the upper side of the beam and movable therealong, said slide having a socket therein, an interchangeable bar in said slide socket, and a stop protruding from the upper surface of the beam and located between the slide and abutment and spaced from the abutment, means to secure said stop in adjusted position along said beam and power means engaging said stop and slide for moving said slide with reference to said stop and said first abutment.

2. In a frame straightening apparatus, a horizontal beam provided with ratchet teeth along one surface thereof, a stop engaging the opposite surface of the beam and extending thereacross, arms extending from the stop along both sides of the beam at an acute angle to the surface supporting the stop and to a point beyond the opposite toothed surface and a crossbar connecting the arms and provided with a portion to engage said teeth, the acute angle being sufficient to cause the portion engaging the teeth to become disengaged by rocking the stop and arms so that sliding of the stop along the beam may be had.

3. A frame straightening apparatus as in claim 2 wherein means spaced from the stop and carried by said arms engage said beam surface and serve as a fulcrum point to rock said stop about for adjusting the same.

4. A frame straightening apparatus as in claim 2 wherein a slide is movably mounted on the upper side of the beam, and power means engages the stop and slide for moving the slide with reference to the stop.

5. In a frame straightening apparatus, a horizontal beam provided with ratchet teeth along the lower surface thereof, an abutment protruding from the upper surface of the beam, a slide protruding from the same surface of the beam as said abutment, said slide carrying a second abutment, a stop protruding from the upper surface located between said abutment and slide and having means engageable with a selected one of said teeth for adjustably positioning the stop along said beam, power means engaging said stop and slide for moving said slide with reference to said stop and said first abutment and means coupled with said slide for engaging said teeth to hold the slide in position while said stop is moved to engage a different selected tooth.

References Cited in the file of this patent

UNITED STATES PATENTS

| 1,815,180 | Bennett | July 21, 1931 |
| 1,894,293 | Green | Jan. 17, 1933 |
| 2,692,002 | Merrill et al. | Oct. 19, 1954 |
| 2,836,219 | Pertner | May 27, 1958 |

FOREIGN PATENTS

| 141,567 | Australia | June 14, 1951 |